United States Patent [19]

Lawson

[11] 4,371,301
[45] Feb. 1, 1983

[54] MODIFIED SPIRAL WOUND RETAINING RING
[75] Inventor: Ashby G. Lawson, Tabb, Va.
[73] Assignee: The United States of America as represented by the Administrator of the National Aeronautics and Space Administration, Washington, D.C.
[21] Appl. No.: 182,880
[22] Filed: Aug. 29, 1980
[51] Int. Cl.³ .............................................. F16B 21/18
[52] U.S. Cl. ..................................... 411/517; 411/353
[58] Field of Search .............. 411/517, 518, 516, 353, 411/352, 153, 543

[56] References Cited
U.S. PATENT DOCUMENTS
397,935 2/1889 Powell ........................... 411/153 X FOREIGN PATENT DOCUMENTS
279991 4/1952 Switzerland ...................... 411/517

Primary Examiner—Ramon S. Britts
Attorney, Agent, or Firm—Howard J. Osborn; John R. Manning

[57] ABSTRACT

A spiral wound retaining ring 10 with angled ends 214 and 216 is disclosed. The ring is crimped 220 at the same angle as the ring ends to maintain a constant thickness dimension. The angling of the ends of the ring and crimp allow the ends to be positioned closer together while maintaining enough clearance to enable insertion and removal of the ring. By reducing the separation distance between the ends a stronger ring results since the double layer area of the ring is maximized.

5 Claims, 5 Drawing Figures

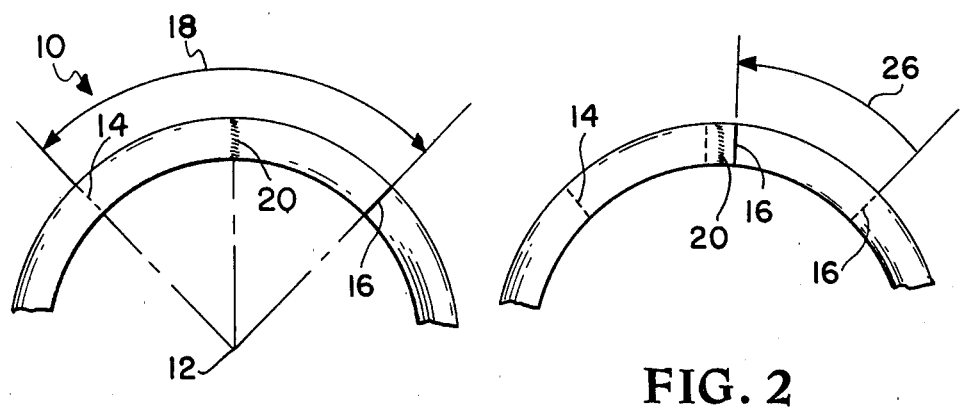
FIG. 1
FIG. 2
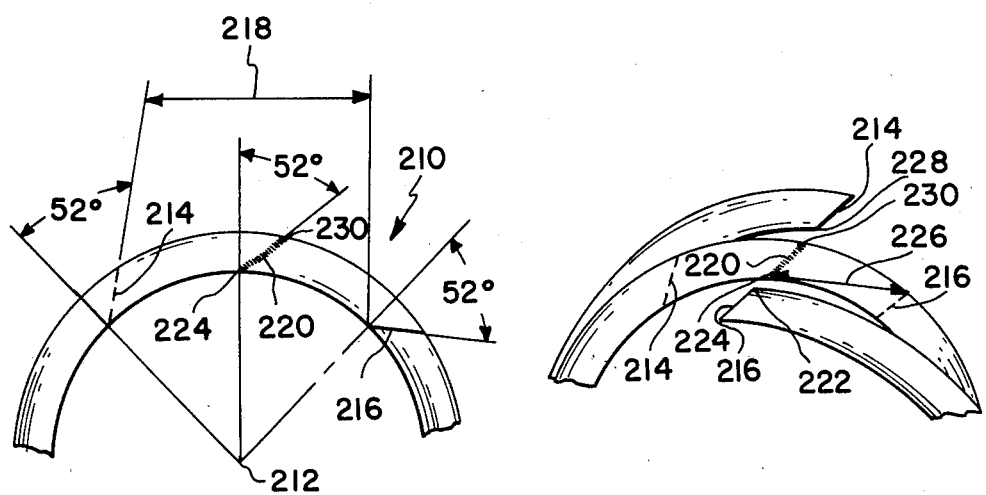
FIG. 3
FIG. 4
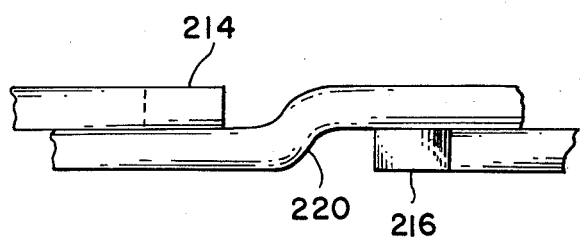
FIG. 5

MODIFIED SPIRAL WOUND RETAINING RING

ORIGIN OF THE INVENTION

The invention described herein was made by an employee of the United States Government and may be manufactured and used by or for the Government for governmental purposes without the payment of any royalties thereon or therefor.

TECHNICAL FIELD

This invention relates to retaining rings and in particular to spiral wound retaining rings.

A retaining ring is used in a groove inside a retaining cylinder (interior ring) or outside a retaining cylinder (exterior ring). The ring protrudes from the groove so as to block a slightly smaller retained cylinder shaped within the retaining cylinder (in the case of an interior ring) or slightly larger retained cylinder within which the retaining cylinder is slipped (in the case of an exterior ring). In either case, the ring provides an abuttment for the retained cylinder strong enough to withstand the load applied to the retained cylinder.

BACKGROUND OF THE INVENTION

Spiral wound retaining rings are well known in the art. These rings consist of two or more turns of a flat material wound to provide a continuous coil. The typical ring is wound two times, the end of the material not quite reaching the beginning. Thus, about 80–90 percent of the ring is comprised of a double layer, the remaining 20 percent is a single layer. This single layer area is necessary to facilitate insertion and removal of the ring. To insert an interior ring the ends are pulled together to temporarily decrease the diameter of the ring, this enables the ring to fit into the cylinder. Once the ring is placed into the groove and the ends released the ring springs back to its larger diameter to stay securely in position. The single layer area provides enough clearance to pull the ends closer together without any overlap since a three layer section would not fit into the groove.

Since the standard retaining ring is comprised of a single layer over from 10–20 percent of its surface the load that is applied to the ring and therethrough to the groove in the retaining cylinder is distributed over from 80–90 percent of the surface of the ring and groove. For most applications this poses no difficulty since the ring and groove can be designed to withstand the entire load over less than their entire surface. However, in critical situations it may be impossible to make the groove so strong and consequently, the grooves may deform when a load is applied. For example, in a particular rocket engine a groove constructed of fiberglass could not withstand a load distributed over only 80–90 percent of the groove. However, the groove could and did withstand the same load when a retaining ring with decreased single layer area was used to distribute the load over approximately 98 percent of the ring and groove surfaces.

It is therefore an object of this invention to provide a retaining ring with decreased single layer area.

Another object of the invention is to provide a retaining ring that distributes a load over a greater proportion of its surface than standard retaining rings.

These and other objects of the present invention and the advantages attendant therewith will be readily understood when the specification is taken in conjunction with the attached drawings to which it relates.

DESCRIPTION OF THE INVENTION

The present invention provides a superior interior retaining ring by reducing the area of single thickness present in prior art retaining rings. This is accomplished by cutting the ends of the ring at an angle with respect to a radial line merging from the center of the ring. Both ends are cut at the same angle, this allows the ends to be positioned closer together and still provide the clearance necessary to contract the ring during insertion and removal.

DESCRIPTION OF THE DRAWINGS

FIG. 1 is a partial view of a standard spiral wound retaining ring;

FIG. 2 is a partial plan view of a standard retaining ring displaying a contracted ring for insertion or removal;

FIG. 3 is a partial plan view of the invention, displaying the angled ends of the ring;

FIG. 4 is a partial plan view of; and

FIG. 5 is a top plan view of the invention.

DETAILED DESCRIPTION OF THE INVENTION

FIG. 1 displays a standard retaining ring 10 in which ends 14 and 16 are cut at an angle 0° as measured from the center 12 of the ring. A separation 18 of ends 14 and 16 allows the ends to be pulled closer together thereby reducing the diameter of the ring 10 during insertion and removal. The portion of the ring between ends 14 and 16 is comprised of a single layer. End 14 can be pulled toward the clamp 20 thereby allowing a certain reduction in the diameter of ring 10 that depends upon the size of the ring and the length of separation 18. Note that end 14 or 16 cannot be pulled beyond crimp 20 since that would produce an effective three layer section of the ring. Crimp 20 is necessary to enable the entire ring to lie in the same plane and therefore fit into a cylindrical groove of constant width.

Referring now to FIG. 3, it will be seen that the present invention allows reduction of the separation distance between the ends of the ring without a corresponding decrease in the diameter reduction capability of the ring.

Retaining ring 210 has ends 214 and 216 cut at an angle $\theta$ as measured from center 212 of the ring. An angle $\theta$ of 52° was found to be best suited for this purpose. Crimp 220 is placed at the same angle $\theta$ that is used for the ends 214 and 216. Separation distance 218 between ends 214 and 216 is substantially less than separation distance 18 depicted in FIG. 1. In order to reduce the diameter of ring 210 for insertion or removal point 222 of end 216 can be pulled to point 224 of crimp 220. Arrow 226 in FIG. 4 displays the distance traveled by end 216. The diameter of the ring can be decreased further by continuing to pull end 216 until point 228 of end 214 approaches point 230 of crimp 220. This can be compared with FIG. 2 wherein arrow 26 shows the distance traveled by end 16 in a standard retaining ring to see easily why separation distance 218 in FIG. 3 can be made considerably smaller than separation distance 18 in FIG. 1. By reducing the separation distance 218, the double layer area of the ring is increased whereby the advantages identified above are realized.

What is claimed:

1. A spiral wound retaining ring comprising:
   a spiral wound ring;
   said ring having ends thereof angled within a plane parallel to the upper and lower surfaces of the ring with respect to a radial line emerging from the center of said ring, both of said ends being angled to the same degree and in the same direction; and
   said ring having a crimp oriented on the ring between said angled ends.

2. A retaining ring as in claim 1 wherein said crimp is angled at the same angle as said ends are angled within a plane parallel to the upper and lower surfaces of the ring with respect to a radial line emerging from the center of said ring.

3. A retaining ring as in claim 2 wherein the angle of said ends and said crimp is 52°.

4. A retaining ring as in claim 3 spirally wound into at least two layers over most of the area of the ring.

5. A retaining ring as in claim 4 wherein 98 percent of the area of the ring comprises at least two layers.

* * * * *